United States Patent
Nieuwoudt (10) Patent No.: US 11,484,822 B2
(45) Date of Patent: Nov. 1, 2022

(54) INLET VANE DEVICE AND VESSEL CONTAINING SAME

(71) Applicant: Koch-Glitsch, LP, Wichita, KS (US)

(72) Inventor: Izak Nieuwoudt, Wichita, KS (US)

(73) Assignee: Koch-Giltsch, LP, Wichita, KS (US)

( * ) Notice: Subject to any disclaimer, the term of this patent is extended or adjusted under 35 U.S.C. 154(b) by 1132 days.

(21) Appl. No.: 16/071,271

(22) PCT Filed: Jan. 25, 2017

(86) PCT No.: PCT/US2017/014918
§ 371 (c)(1),
(2) Date: Jul. 19, 2018

(87) PCT Pub. No.: WO2017/132245
PCT Pub. Date: Aug. 3, 2017

(65) Prior Publication Data
US 2021/0197106 A1    Jul. 1, 2021

Related U.S. Application Data (60) Provisional application No. 62/287,688, filed on Jan. 27, 2016.

(51) Int. Cl.
*B01D 45/08* (2006.01)
*B01D 3/00* (2006.01)
*B01D 3/32* (2006.01)

(52) U.S. Cl.
CPC ............. *B01D 45/08* (2013.01); *B01D 3/008* (2013.01); *B01D 3/32* (2013.01)

(58) Field of Classification Search
CPC .......... B01D 45/08; B01D 3/008; B01D 3/32; B01D 1/0064
See application file for complete search history.

(56) References Cited

U.S. PATENT DOCUMENTS

| 1,803,854 | A | 5/1931 | Kniskern |
| 3,517,486 | A | 6/1970 | Golden |

(Continued)

FOREIGN PATENT DOCUMENTS

| AU | 2005274791 B2 | 11/2011 |
| AU | 2013202436 B2 | 11/2013 |

(Continued)

OTHER PUBLICATIONS

JP Notification of Reasons for Refusal for application No. 2018-539419 dated Oct. 6, 2020, 9 pages (5 pages English Translation and 4 pages official document).

(Continued)

*Primary Examiner* — Stephen Hobson (57) ABSTRACT

A vane inlet device is provided in a vessel to receive and redistribute a fluid stream entering the vessel and to facilitate separation of liquid from the fluid stream. The vane inlet device includes a passageway bounded by a top plate and a bottom plate spaced from the top plate. First and second arrays of vanes extend between the top and bottom plates and are positioned to receive respective portions of the fluid stream flowing from an inlet end of the passageway toward an opposite end and redirecting it out opposite sides of the passageway. A spacing between the first array of vanes and the second array of vanes progressively decreases in a direction from the inlet end of the passageway toward the opposite end. A beam extends from the top plate to the bottom plate between the first and second arrays of vanes to reduce flexure of the top and bottom plates and to separate the respective portions of the fluid stream.

19 Claims, 11 Drawing Sheets

(56) References Cited

U.S. PATENT DOCUMENTS

| | | | |
|---|---|---|---|
| 5,845,504 A | 12/1998 | LeBleu | |
| 6,386,520 B2* | 5/2002 | McEwan | B01J 19/006 261/114.1 |
| 6,673,057 B1 | 1/2004 | Ehrnsperger et al. | |
| 6,811,842 B1 | 11/2004 | Ehrnsperger et al. | |
| 6,852,146 B2 | 2/2005 | Holmes et al. | |
| 6,966,940 B2 | 11/2005 | Krisko et al. | |
| 7,052,545 B2 | 5/2006 | Quake et al. | |
| 7,091,367 B2 | 8/2006 | Moritz et al. | |
| 7,424,999 B2 | 9/2008 | Xu et al. | |
| 7,459,001 B2* | 12/2008 | Christiansen | B01D 45/16 55/343 |
| 7,488,361 B2* | 2/2009 | Larnholm | B01D 50/20 55/318 |
| 7,550,117 B2 | 6/2009 | Alward et al. | |
| 7,594,942 B2* | 9/2009 | Polderman | B01D 45/08 55/455 |
| 7,618,472 B2 | 11/2009 | Agnello et al. | |
| 7,655,070 B1 | 2/2010 | Dallas et al. | |
| 7,699,767 B2 | 4/2010 | Mueth et al. | |
| 7,699,909 B2 | 4/2010 | Lackner et al. | |
| 7,947,239 B2 | 5/2011 | Lackner et al. | |
| 7,988,860 B2 | 8/2011 | Kalayci et al. | |
| 8,020,838 B2 | 9/2011 | Heldwein et al. | |
| 8,025,718 B2* | 9/2011 | Kooijman | B01D 19/0042 95/271 |
| 8,070,141 B2* | 12/2011 | Kooijman | B01D 1/305 95/271 |
| 8,075,852 B2 | 12/2011 | Gao et al. | |
| 8,110,395 B2 | 2/2012 | Lewnard et al. | |
| 8,197,687 B2 | 6/2012 | Krogue et al. | |
| 8,246,731 B2 | 8/2012 | Lackner et al. | |
| 8,282,804 B2 | 10/2012 | Tryti et al. | |
| 8,354,029 B2 | 1/2013 | Hank | |
| 8,357,296 B2 | 1/2013 | Bonhomme et al. | |
| 8,444,732 B2 | 5/2013 | Bratton | |
| 8,485,504 B2* | 7/2013 | Headley | B01D 3/326 261/114.5 |
| 8,507,253 B2 | 8/2013 | Berzin | |
| 8,524,082 B2 | 9/2013 | Wiemers et al. | |
| 8,597,505 B2 | 12/2013 | Fulkerson et al. | |
| 8,627,848 B2* | 1/2014 | Bambara | B01D 19/0042 55/440 |
| 8,790,517 B2 | 7/2014 | Wiemers et al. | |
| 8,815,091 B2 | 8/2014 | McGinnis | |
| 8,888,076 B2 | 11/2014 | Tamminen et al. | |
| 9,039,899 B2 | 5/2015 | McGinnis | |
| 9,643,105 B1* | 5/2017 | Walker | B01D 21/0042 |
| 9,789,429 B2* | 10/2017 | Schook | B01D 46/003 |
| 10,792,592 B2* | 10/2020 | Nieuwoudt | B01D 19/0057 |
| 2001/0038156 A1* | 11/2001 | Mcewan | B01J 4/001 261/114.1 |
| 2003/0000186 A1* | 1/2003 | West | B01D 45/14 55/455 |
| 2005/0060970 A1* | 3/2005 | Polderman | B01D 45/08 55/320 |
| 2007/0044437 A1* | 3/2007 | Larnholm | B01D 45/16 55/319 |
| 2007/0085227 A1 | 4/2007 | Tonkovich et al. | |
| 2008/0168753 A1* | 7/2008 | Christiansen | B01D 45/16 55/440 |
| 2009/0078118 A1* | 3/2009 | Kooijman | B01D 3/008 96/207 |
| 2011/0259812 A1 | 10/2011 | Marks et al. | |
| 2011/0278218 A1 | 11/2011 | Dionne et al. | |
| 2012/0267306 A1 | 10/2012 | McGinnis et al. | |
| 2013/0220907 A1 | 8/2013 | Fulkerson et al. | |
| 2013/0292319 A1 | 11/2013 | Fulkerson et al. | |
| 2014/0366732 A1 | 12/2014 | Gao et al. | |
| 2015/0209695 A1 | 7/2015 | McCarthy et al. | |
| 2015/0247836 A1 | 9/2015 | Szymkowiak et al. | |

FOREIGN PATENT DOCUMENTS

| | | |
|---|---|---|
| AU | 2014237819 A1 | 9/2015 |
| CN | 1108847 A | 9/1995 |
| CN | 1241664 A | 1/2000 |
| CN | 100532820 C | 8/2009 |
| CN | 101596370 B | 5/2011 |
| CN | 202155075 U | 3/2012 |
| CN | 101321567 B | 3/2013 |
| CN | 204121922 U | 1/2015 |
| CN | 204147712 U | 2/2015 |
| CN | 204147720 U | 2/2015 |
| CN | 104607111 A | 5/2015 |
| CN | 102985157 B | 6/2015 |
| CN | 204365094 U | 6/2015 |
| CN | 104162353 B | 6/2016 |
| CN | 104246983 B | 3/2017 |
| DE | 102009022673 A1 | 12/2010 |
| EP | 0195464 A1 | 9/1986 |
| EP | 0861114 A4 | 7/1999 |
| EP | 1917099 A2 | 5/2008 |
| EP | 2046938 A2 | 4/2009 |
| EP | 1881865 B1 | 4/2018 |
| GB | 1119699 A | 7/1968 |
| IN | 263252 B | 10/2014 |
| JP | 2004500237 A | 1/2004 |
| JP | 2005305437 A | 11/2005 |
| JP | 2008540111 A | 11/2008 |
| JP | S441409 B2 | 1/2010 |
| JP | 4825166 B2 | 9/2011 |
| KR | 20140125424 A | 10/2014 |
| KR | 20150081343 A | 7/2015 |
| RU | 10599 U1 | 8/1999 |
| SU | 558681 A1 | 5/1977 |
| WO | WO0160478 A1 | 8/2001 |
| WO | 2005058503 A1 | 6/2005 |
| WO | WO2014195796 A1 | 12/2014 |
| WO | WO2015023468 A1 | 2/2015 |

OTHER PUBLICATIONS

International Search Report & Written Opinion for Corresponding PCT Application No. PCT/US2017/014918, 10 pages.

Office action received for IN application No. 201847028904, dated Sep. 21, 2020, 5 pages.

\* cited by examiner

INLET VANE DEVICE AND VESSEL CONTAINING SAME

CROSS-REFERENCE TO RELATED APPLICATION

This is a 371 application of PCT/US17/14918 filed Jan. 25, 2017, which claims the benefit of prior-filed U.S. provisional Application No. 62/287,688, filed on Jan. 27, 2016, which is hereby incorporated by reference in its entirety.

BACKGROUND OF THE INVENTION

The present invention relates generally to vessels in which phase separation of a fluid stream occurs and, more particularly, to an inlet vane device for redirecting the flow of the fluid stream as it enters the vessel and facilitating the removal of a liquid phase from the fluid stream.

Various types of inlet devices are used in vessels such as separators and distillation towers to redirect and reduce the momentum of a fluid stream as it is introduced into the vessel. These inlet devices are also used to facilitate the removal of a liquid phase from a gas phase in the fluid stream so that a lower liquid load is presented to a mist eliminator or other internal that may be positioned downstream from the inlet device.

One type of inlet device, referred to as a vane inlet device, uses first and second arrays of curved vanes that converge toward each other in the direction of the inflow of the fluid stream. The vanes partition the feed stream into smaller segments and redirect them out the sides of the vane inlet device for outward flow across the internal area of the vessel. The vanes are connected to top and bottom plates that confine the flow of the fluid stream and serve as mounting surfaces for the vanes. In applications where the fluid stream has a high velocity or volumetric flow, the components of the vane inlet device must be formed from thicker gauge materials or must otherwise be strengthened to withstand the vibratory forces exerted by the fluid stream. Increasing the thickness of the components will normally increase the fabrication cost of the vane inlet device, significantly so when the components must be formed of expensive specialized materials to withstand the conditions within the vessel. Conventional vane inlet devices are also limited in the ability to regulate the respective amounts of the fluid stream discharged out the sides of the vane inlet device.

A need has thus developed for a vane inlet device having greater resistance to the vibratory forces caused by the fluid stream, as well as an increased ability to regulate the flow of the fluid stream within and when discharged from the vane inlet device.

SUMMARY OF THE INVENTION

In one aspect, the present invention is directed to a vane inlet device for use in a vessel to receive and redistribute a fluid stream entering the vessel. The vane inlet device comprises a passageway bounded by a top plate and a bottom plate spaced from the top plate. The passageway has an inlet end for receiving the fluid stream when it enters the vessel, an opposite end, and first and second sides. The vane inlet device also includes a first array of vanes positioned in spaced apart relationship to each other along the first side of the passageway for receiving a first portion of said fluid stream when flowing from the inlet end of the passageway toward the opposite end and redirecting it out the first side of the passageway. The vane inlet device includes a second array of vanes positioned in spaced apart relationship to each other along the second side of the passageway for receiving a second portion of said fluid stream when flowing from the inlet end of the passageway toward the opposite end and redirecting it out said second side of the passageway. A spacing between the first array of vanes and the second array of vanes progressively decreases in a direction from the inlet end of the passageway toward the opposite end. The vane inlet device further includes a beam extending from the top plate to the bottom plate between the first and second arrays of vanes to reduce flexure of the top and bottom plates. The beam also serves to separate the first and second portions of the fluid stream as they flow through the passageway.

In another aspect, the present invention is directed to a vessel comprising an external shell defining an interior volume, an opening in the external shell for delivering a fluid stream into the interior volume, an inlet flange surrounding the opening and extending outwardly from the external shell, and a vane inlet device as described above positioned primarily in the interior volume of the external shell of the vessel in alignment with the opening and connected to an interior surface of the external shell.

DETAILED DESCRIPTION

Figure 1:
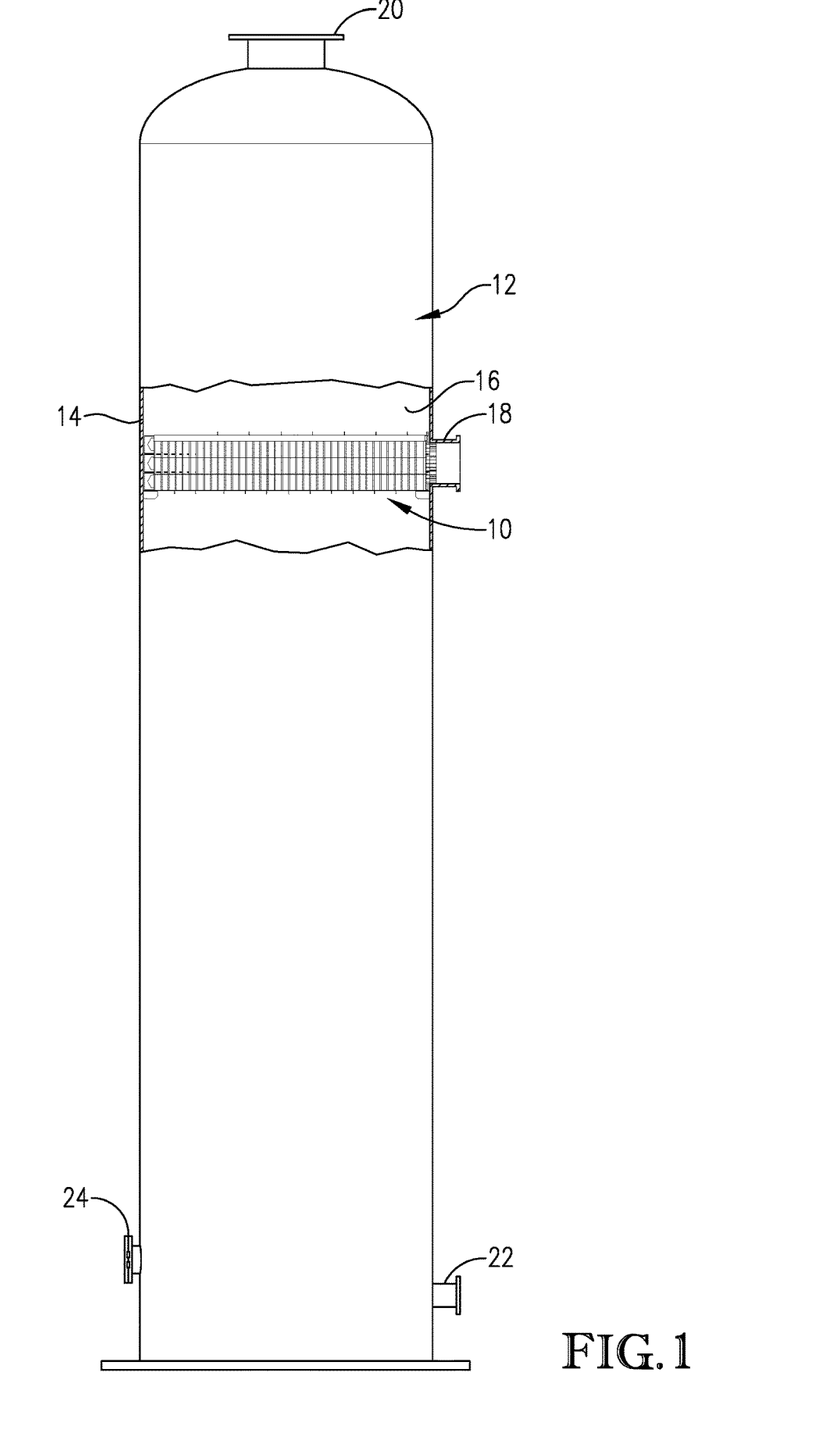
FIG. 1 is a side elevation view of a vessel, with a portion of an external shell of the vessel broken away to show a vane inlet device of the present invention positioned within an internal region within the vessel to receive and redistribute a fluid stream introduced into the vessel through an inlet nozzle.
Figure 2:
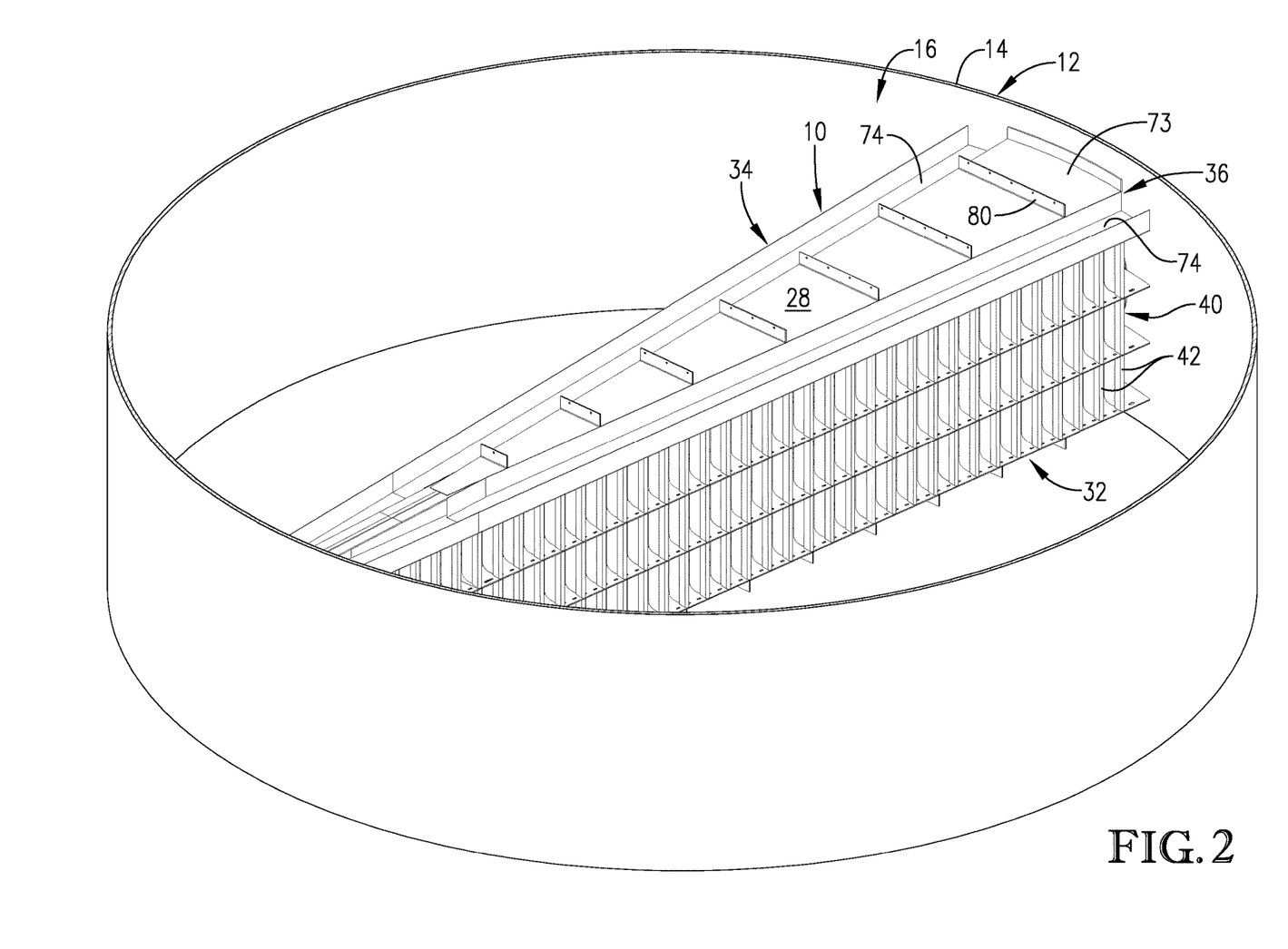
FIG. 2 is an enlarged, fragmentary, top perspective view of the vessel shown in FIG. 1 with the external shell broken away to show the vane inlet device.
Figure 3:
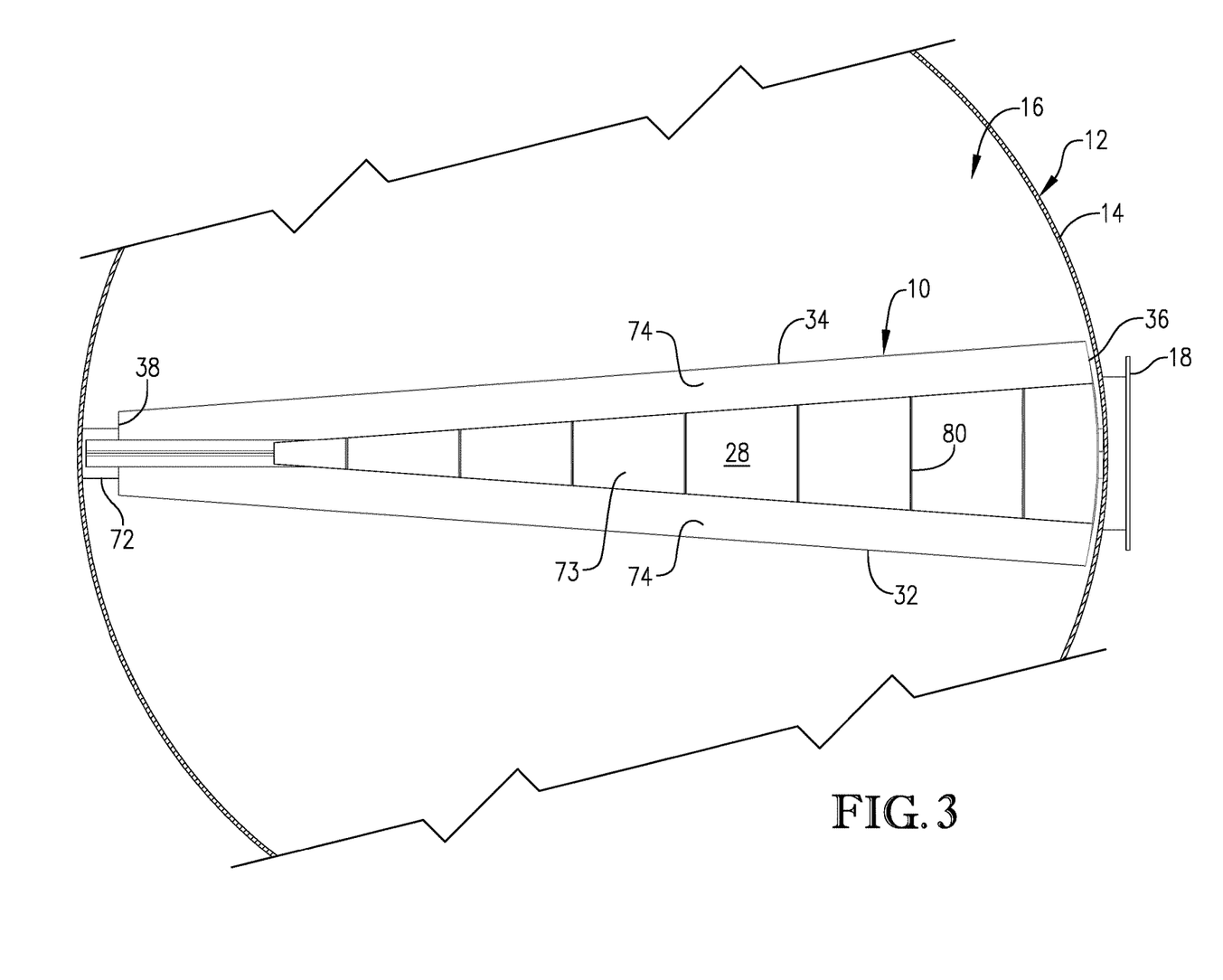
FIG. 3 is a top plan view of the vessel showing the vane inlet device, with portions of the vessel broken away.
Figure 4:
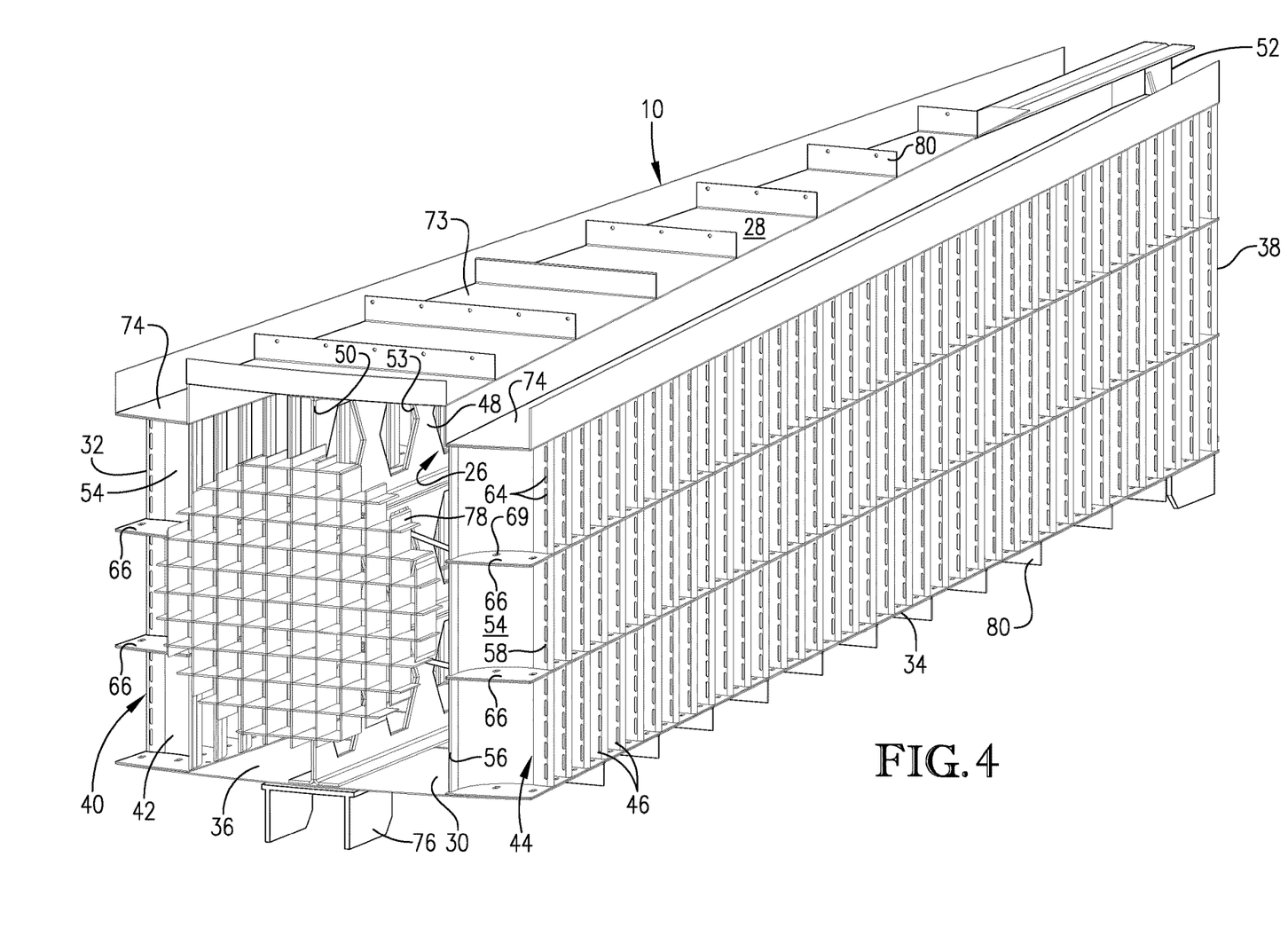
FIG. 4 is an enlarged, front perspective view of the vane inlet device removed from the vessel.
Figure 5:
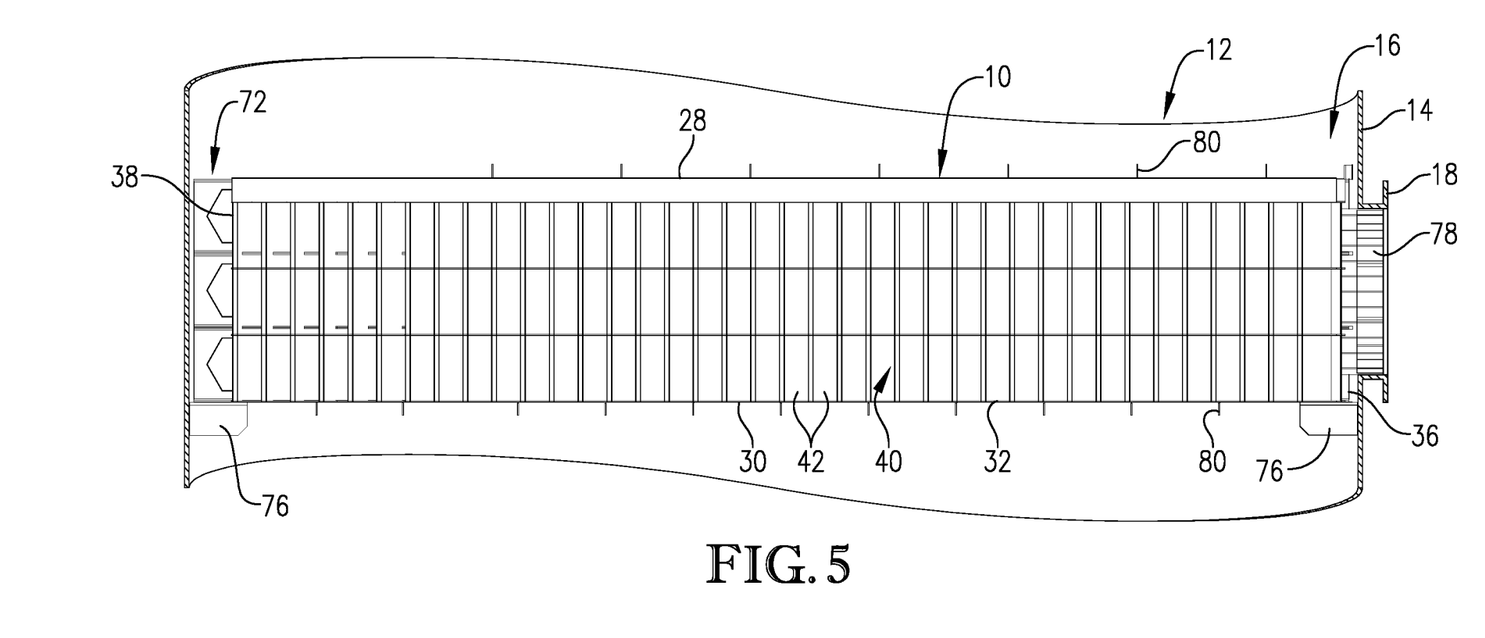
FIG. 5 is a fragmentary, side elevation view of the vessel showing the vane inlet device, with portions of the vessel broken away.
Figure 6:
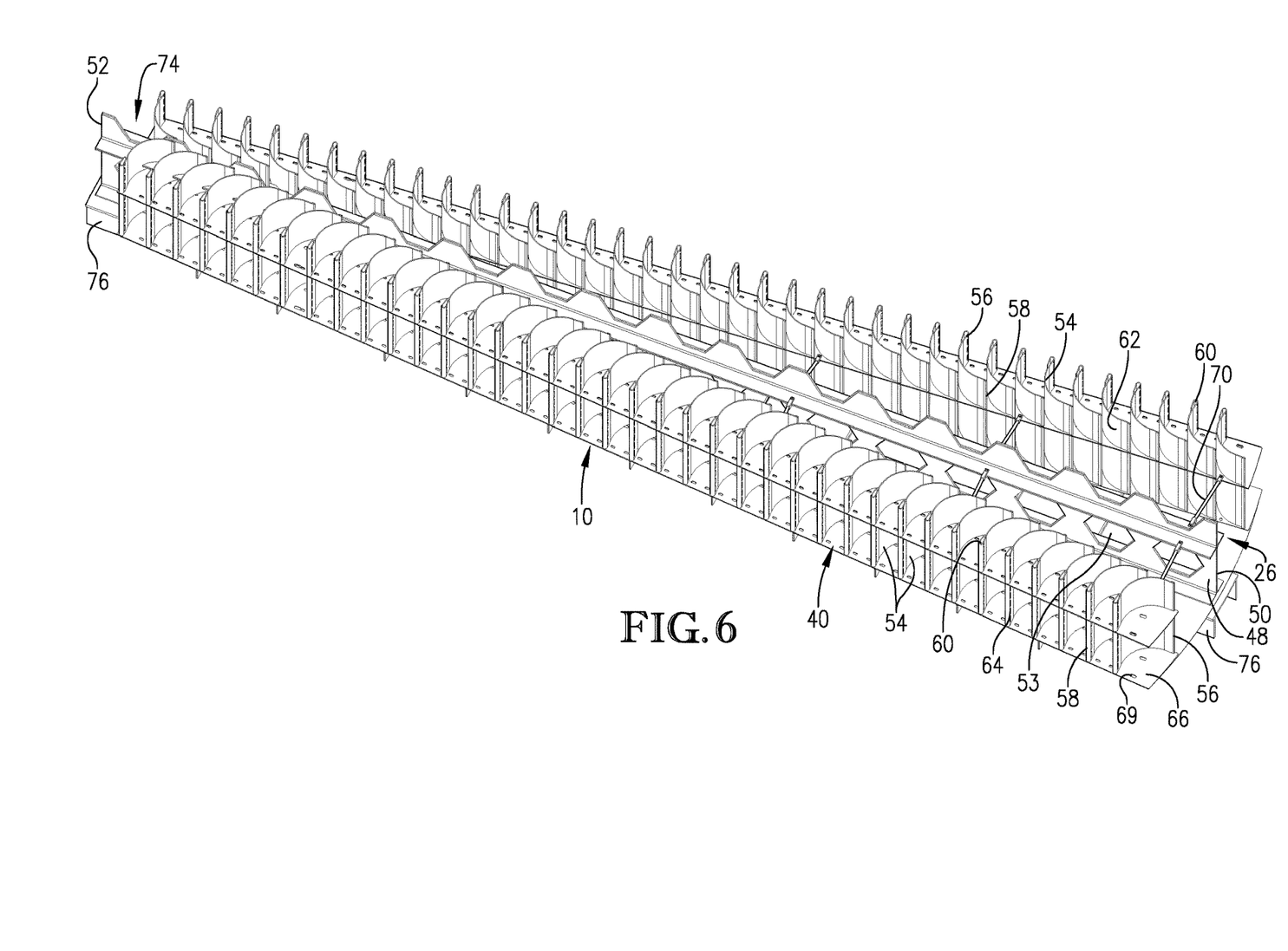
FIG. 6 is a fragmentary, top perspective view of the vane inlet device removed from the vessel and taken in horizontal cross section.
Figure 7:
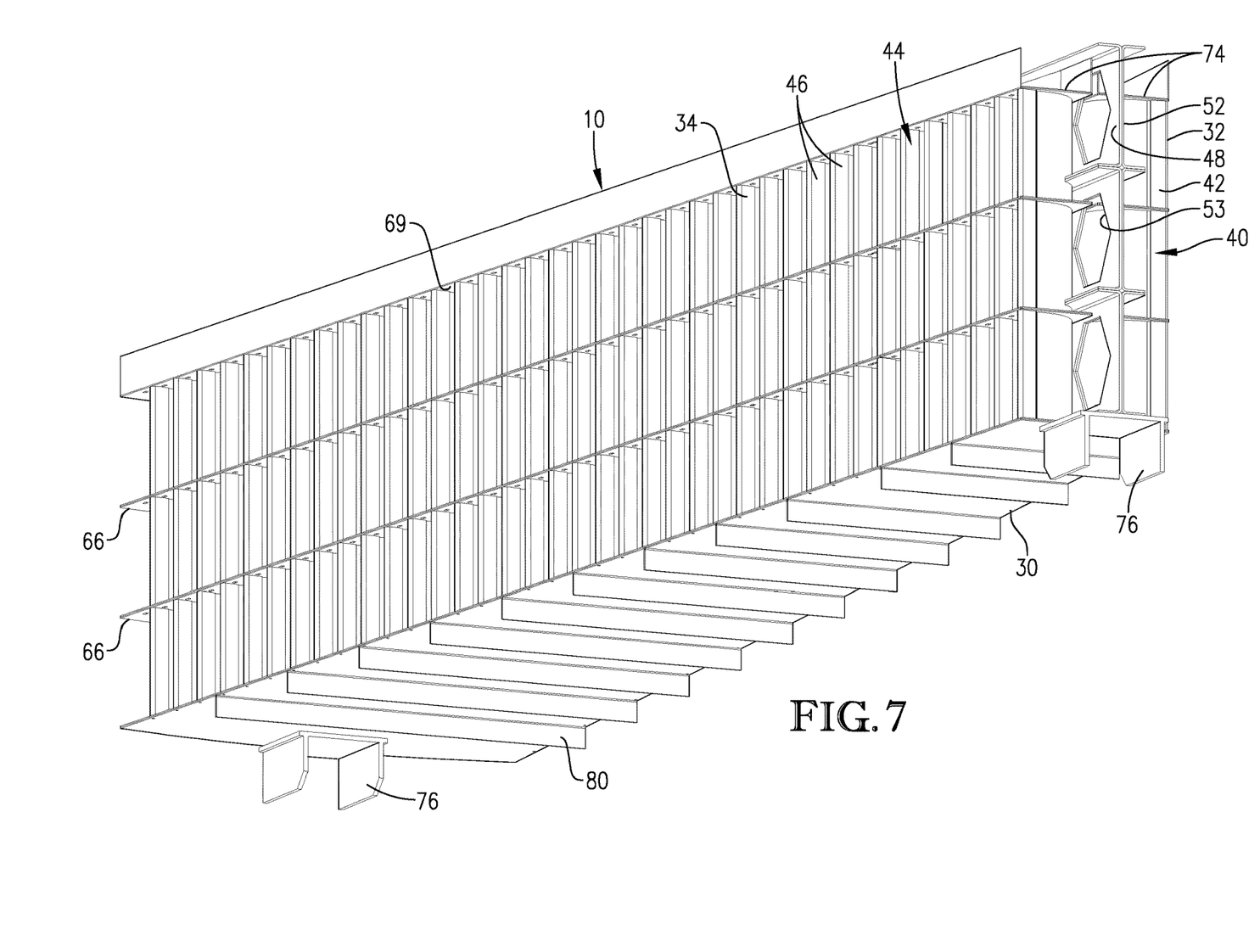
FIG. 7 is an enlarged, rear perspective view of the vane inlet device removed from the vessel.
Figure 8:
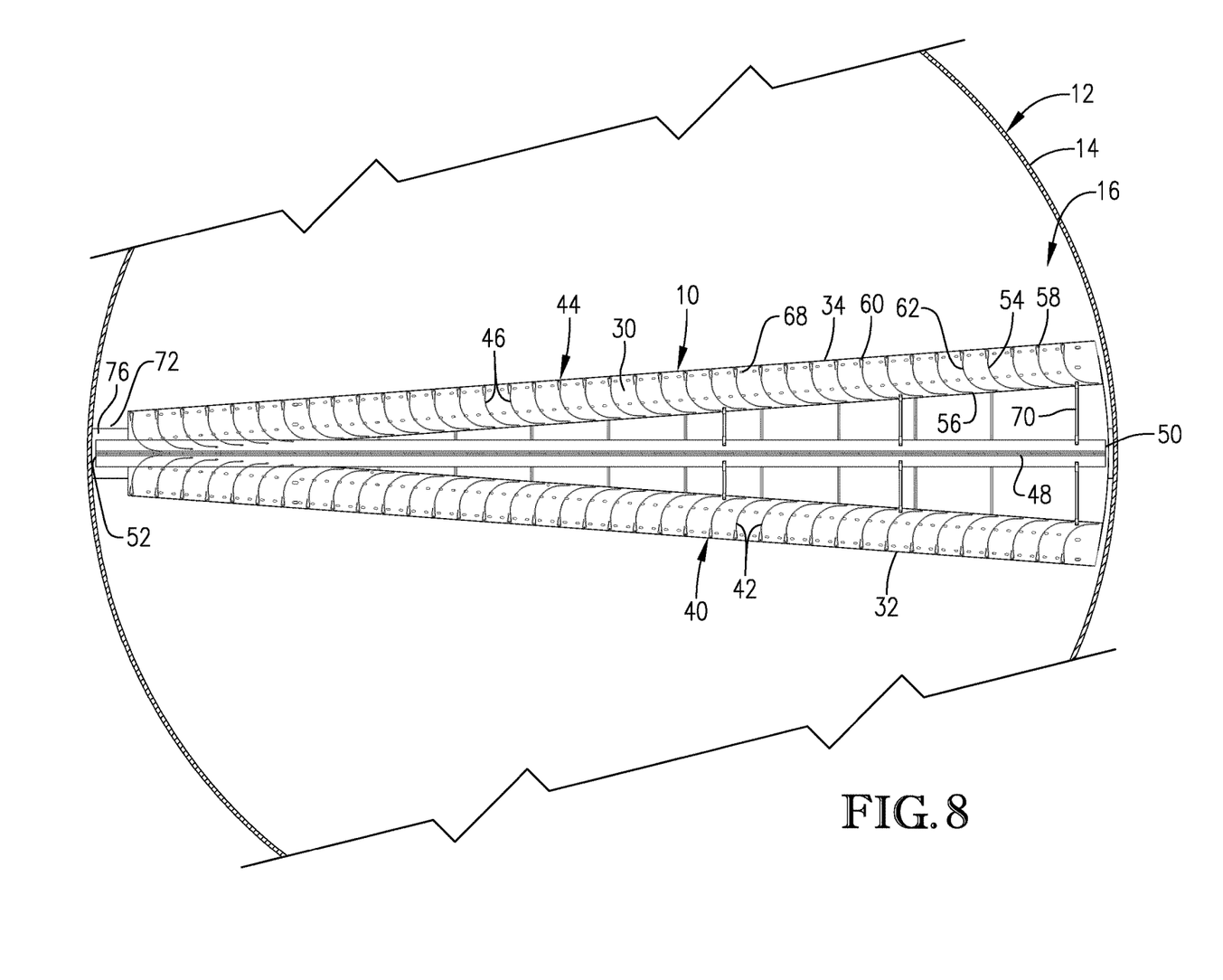
FIG. 8 is a top perspective of the vessel showing the vane inlet device taken in horizontal cross section, with portions of the vessel broken away.
Figure 9:
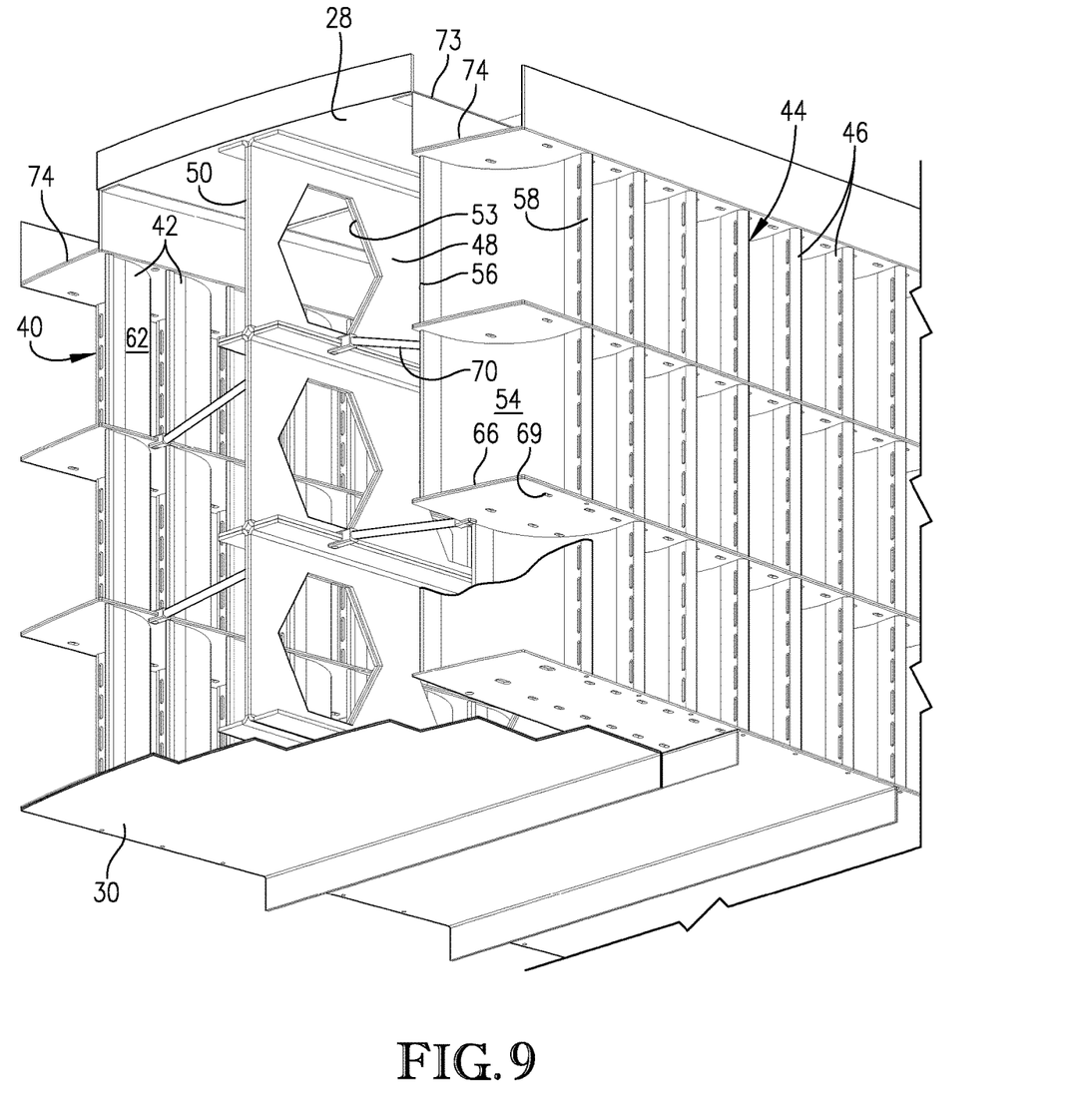
FIG. 9 is an enlarged, front perspective view of the vane inlet device, with portions of the vane inlet device being broken away to better illustrate details of construction.
Figure 10:
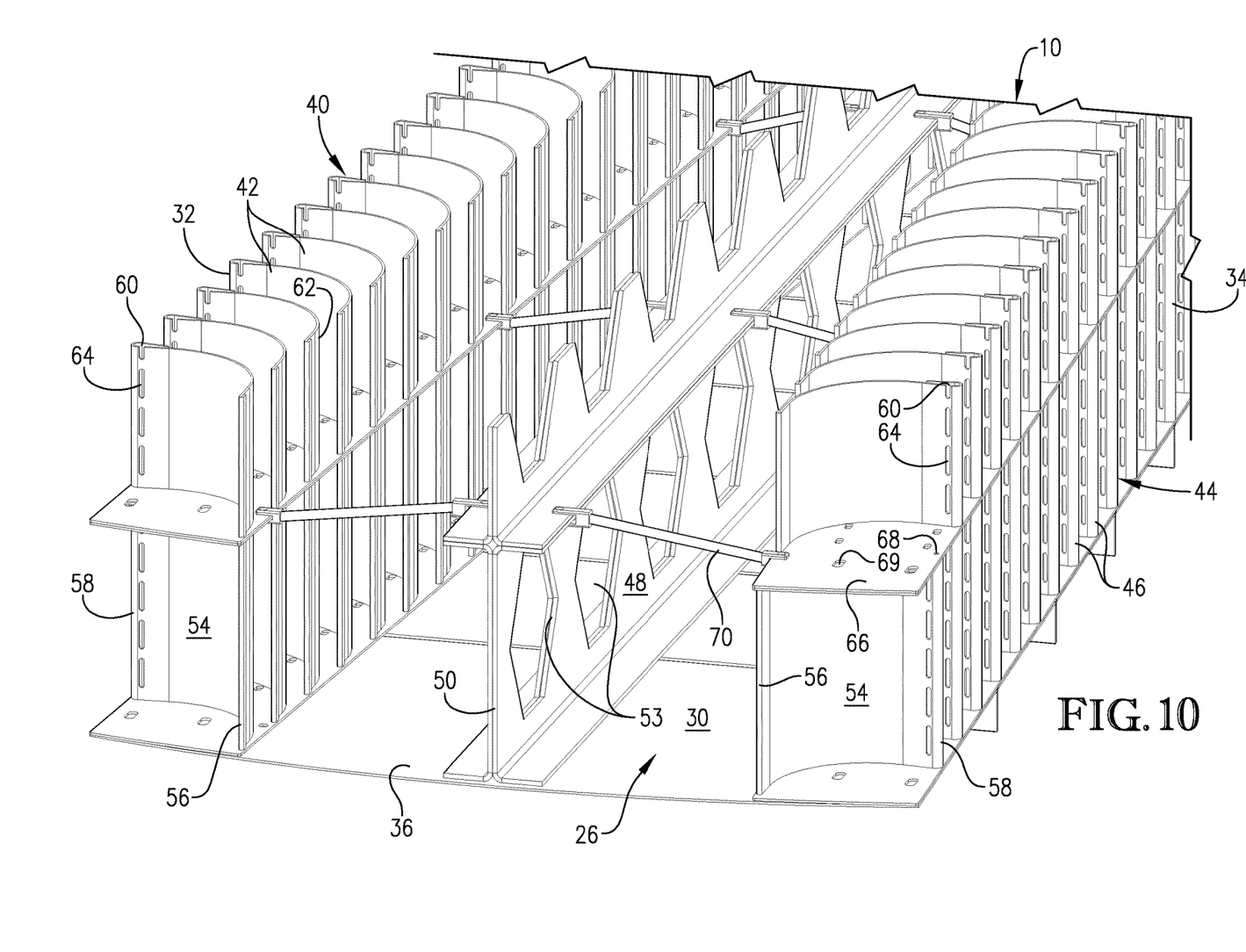
FIG. 10 is an enlarged, fragmental, front perspective view of the vane inlet device taken in horizontal section.

Turning now to the drawings in greater detail and initially to FIG. 1, a vane inlet device 10 in accordance with an embodiment of the present invention is shown mounted within a vessel 12. The vessel 12 may be one in which mass transfer and/or heat exchange processes are intended to occur and/or in which separation of fluid phases in a fluid stream is intended. The vessel 12 includes an external shell 14 that is generally cylindrical in configuration, although other configurations, including polygonal, are possible and are within the scope of the present invention. The shell 14 is of any suitable diameter and length and is constructed from one or more rigid materials that are desirably inert to, or are otherwise compatible with the fluids and conditions present within the vessel 12. The shell 14 may be oriented vertically or horizontally and defines an internal region 16 in which the vane inlet device 10 is located.

In one embodiment, the vessel 12 is a mass transfer column of a type used for processing fluid streams, typically liquid and vapor streams, to obtain fractionation products and/or to otherwise cause mass transfer and/or heat exchange between the fluid streams. For example, the vessel 12 can be one in which crude atmospheric, lube vacuum, crude vacuum, fluid or thermal cracking fractionating, coker or visbreaker fractionating, coke scrubbing, reactor off-gas scrubbing, gas quenching, edible oil deodorization, pollution control scrubbing, and other processes occur. In another embodiment, vessel 12 is a separator for removing or reducing the amount of a liquid phase that is present in the gas phase of the fluid stream.

The vessel 12 includes a flanged inlet nozzle 18 for connecting to a feed line (not shown) to introduce the single-phase or multi-phase fluid stream into the internal region 16 of the vessel 12. Other inlet nozzles may be positioned at other locations on the vessel 12 to introduce other fluid streams into the vessel 12. The vessel 12 will also typically include an overhead nozzle 20 for removing a vapor stream and a bottom stream takeoff nozzle 22 for removing a liquid stream from the vessel 12. A manway 24 may be provided for allowing a person to enter the internal region 16 of the vessel 12 and for internals such as the vane inlet device 10 to be placed within and removed from the vessel 12 during installation, installation, maintenance, and revamping procedures.

Other components that may be used in association with the vessel 12, such as reflux stream nozzles, reboilers, condensers, and the like, are not illustrated in the drawings because they are conventional in nature and an illustration of these components is not believed to be necessary for an understanding of the present invention. Similarly, other internals that may be used in addition to the vane inlet device 10 within the vessel 12, such as liquid distributors, trays, structured and random packings, mist eliminators, and the like, are not shown because they are conventional and unnecessary for an understanding of the present invention.

Turning additionally to FIGS. 2-10, the vane inlet device 10 is positioned in alignment with the inlet nozzle 18, which in one embodiment is oriented to introduce a fluid stream into the internal region 16 in a radial direction with respect to a central axis of the vessel 12. The vane inlet device 10 forms a passageway 26 that receives and redistributes the fluid stream that is introduced into the internal region 16 of the vessel 12 through the inlet nozzle 18. The passageway 26 is bounded by a top plate 28, an optional bottom plate 30, and first and second sides 32 and 34. An inlet end 36 of the passageway 26 is positioned adjacent the inlet nozzle 18 and an opposite end 38 of the passageway 26 is located a preselected distance from the inlet end 36. In one embodiment, the opposite end 38 of the passageway 26 is positioned at or is spaced a preselected distance from the portion of the shell 14 opposite from the inlet nozzle 18. The passageway 26 is generally sized and positioned to receive and redistribute the entire fluid stream as it enters the internal region 16 of the vessel 12 through the inlet nozzle 18.

A first array 40 of vanes 42 is positioned along the first side 32 of the passageway 26 and a second array 44 of vanes 46 is positioned along the second side 34 of the passageway 26. The vanes 42 in the first array 40 are spaced apart from each other a preselected distance, which is normally a uniform distance. Likewise, the vanes 46 in the second array 44 are spaced apart from each other the same or a different distance than the spacing between the vanes 42 in the first array 40. The vanes 42 may be in sideways alignment with vanes 46 or they may be offset from such alignment. The vanes 42 and 46 are further arranged so that they are positioned successively closer to the longitudinal center of the passageway 26 in a direction from the inlet end 36 to the opposite end 38 so that only a portion of each vane 42 and 46 is exposed to the inlet nozzle 18 and the remainder is shielded by the adjacent vane 42 or 46. As a result of this arrangement, when the fluid stream flowing within the passageway 26 encounters each vane 42 and 46, the exposed portion of the vane 42 or 46 separates a portion of the fluid stream from the main flow and diverts it sideways to flow in the spacing between adjacent ones of the vanes 42 or 46 for outward discharge from the respective first or second side 32 or 34 of the passageway 26.

A planar beam 48 is positioned between the first and second arrays 40 and 44 of vanes 42 and 46 extends along the length of the passageway 26 in alignment with the flow of the fluid stream entering the vessel 12 through the inlet nozzle 18. The beam 48 has a forward end 50 positioned near the inlet nozzle 18 and a back end 52 that may be positioned near or beyond the opposite end 38 of the passageway 26. The beam 48 is connected to and extends downwardly from the top plate 28 and is connected to the bottom plate 30, if present.

In one aspect, the beam 48 is positioned centrally in the passageway 26 between the first and second arrays 40 and 44 of vanes 42 and 46 so that the fluid stream is split by the beam 48 into two roughly equal portions for flow along the passageway 26 on opposite sides of the beam 48. The first and second portions of the fluid stream may be substantial equal in flow volume and rate, such as when the fluid stream is introduced into the vessel 12 along its radius and the beam 48 extends along the radius. In other embodiments, the beam 48 can be positioned off-center to split the fluid stream into unequal portions for flow along opposite sides of the beam 48. For example, if the inlet nozzle 18 is positioned non-radially, it may be desirable to cause greater flow of the fluid stream along one side of the beam 48 than the other side of the beam 48 so that the fluid stream is more uniformly distributed across the internal region 16 of the vessel 12 after being discharged from the vane inlet device 10. Positioning the beam 48 off-center from the inlet nozzle 18 a preselected amount will cause the first and second portions of the fluid stream to be unequal, thereby allowing the desired redistribution of the fluid steam to be obtained.

In some applications, the beam 48 has at least one and normally more than one opening 53 located within the passageway 26 to allow at least some of the fluid stream to pass through the beam 48 to equalize the pressure on opposite sides of the beam 48 as the first and second portions of the fluid stream flow within the passageway 26. In some embodiments, the multiple openings 53 are positioned and/or sized to cause greater volumetric flow of the fluid stream in certain regions to thereby achieve the desired distribution of the fluid stream after it is discharged by the vane inlet device 10.

In another aspect, the beam 48 serves to dampen vibrations that the fluid stream might otherwise impart to the vane inlet device 10, particularly when the fluid stream has a high velocity and mass flow rate, and to generally increasing the rigidity and strength of the vane inlet device 10. When interconnected, the beam 48 and the top and bottom plates 28 and 30 form an I-beam construction that greatly increases the ability of the vane inlet device 10 to withstand the vibratory forces. The beam 48 may be of a one-piece construction or it may be formed from separate smaller segments that are sized to be inserted through the manway 24 and joined together within the internal region 16 of the vessel 12. The segments forming the beam 48 are joined together along edges that extend longitudinally in the direction from the inlet end 36 to the opposite end 38 of the passageway 26. Various methods may be used to secure the segments together, such as by welding, bolting or using pin connectors of the type disclosed in U.S. Pat. No. 8,485,504, the disclosure of which is incorporated herein by reference.

Each vane 42 and 46 is curved in a direction to present a concave surface on a front side 54 of the associated vane 42 or 46 that faces in a direction toward the inlet nozzle 18. Each vane 42 and 46 has a leading edge 56 positioned nearest the beam 48 and an opposite trailing edge 58. In one embodiment, the leading edges 56 of the vanes 42 in the first array 40 are positioned in a first common vertical plane and the leading edges 56 of the vanes 46 in the second array 44 are positioned in a second common vertical plane, with the first and second common vertical planes converging toward each other in the direction from the inlet end 36 of the passageway 26 toward the opposite end 38. In other embodiments, the leading edges 56 of the vanes 42 and 46 may be in a curved or other non-linear arrangement, such as when there is non-uniform spacing between some of the vanes 42 or 46 in their respective first and second arrays 40 and 44.

The trailing edge 58 of each of the vanes 42 in the first array 40 and each of the vanes 46 in the second array 44 is formed into a liquid collection channel 60 positioned on a back side 62 of the respective vane 42 or 46. An aperture 64 or multiple ones of the aperture 64 are positioned near the trailing edge 58 of each vane 42 and 46 and extends from the front side 54 to the back side 62 of the vane 42 or 46. Each aperture 64 is positioned to allow liquid on the front side 54 of the vane 42 or 46 to pass through the vane 42 or 46 and enter the liquid collection channel 60 on the back side of the vane 42 or 46. The liquid collection channel 60 may extend perpendicularly to the top plate 28 or it may be inclined at an angle thereto.

The vanes 42 and 46 are connected to the top plate 28 and extend to and are connected to the bottom plate 30, when present. Each vane 42 and 46 may be of a one-piece construction or multiple segments may be joined together to form each vane 42 and 46. For example, as illustrated, each vane 42 and 46 may be formed by individual segments that are joined to webs 66. Openings 68 are provided in the webs 66 in alignment with the liquid collection channels 60 to allow liquid to flow downwardly in liquid collection channels 60 through the webs 66 for exiting the vane inlet device 10. Other openings 69 are positioned in the webs 66 to allow liquid outside the liquid collection channels 60 to also pass through the webs 66. The webs 66 may be interconnected to the beam 48 by braces 70 to add greater strength and rigidity to the vane inlet device 10.

The passageway 26 is closed at the opposite end 38 to the flow of the fluid stream, such as by positioning the final ones of the vanes 42 and 46 in contact with the beam 48. A vertically-extending drain passage 72 is formed at the opposite end 38 of the passageway 26 beyond and on the opposite side of the final ones of the vanes 42 and 46. The drain passage 72 extends downwardly from the top plate 28 to the bottom plate 30, if present.

The top plate 28 may comprise a central potion 73 covering the area between the first and second arrays 40 and 44 of vanes 42 and 46 and drain channels 74 that extend along and cover the first and second arrays 40 and 44 and feed into the drain passage 72. In one embodiment, the central portion 73 of the top plate 28 is elevated above the drain channels 74 to cause liquid to flow from the top plate 28 into the drain channels 74.

The vane inlet device 10 is secured to the inner surface of the external shell 14 of the vessel 12, such as by welding or other suitable means. For example, the vane inlet device 10 may include beam seats 76 that are welded or otherwise secured to an undersurface of the bottom plate 30 at opposite ends thereof for welding or other securement to the inner surface of the external shell 14.

The vane inlet device 10 may also include a flow straightening device 78 at the inlet end 36 of the passageway 26 to reduce the turbulence of the fluid stream before it encounters the vanes 42 and 46 in the passageway 26. The flow straightening device may, in one embodiment, comprise a grid-like structure that extends a preselected distance into the inlet nozzle 18 so that the turbulence of the fluid stream is reduced before it enters the interior region 16 of the vessel 12. The vane inlet device 10 may also include braces 80 that extend transversely across the top plate 28 and the bottom the plate 30 at spaced apart locations to strengthen the vane inlet device 10.

It can be seen that the vane inlet device 10 operates to receive the fluid stream entering the vessel 12 through the inlet nozzle 18 and initially subdivide it into first and second portions as the fluid stream encounters and flows along opposite sides of the beam 48. Each of the first and second portions of the fluid stream is then further subdivided as it encounters the first and second arrays 40 and 44 of vanes 42 and 46 and is redirected by the vanes 42 and 46 to flow outwardly in the spacing between adjacent ones of the vanes 42 or 46. The subdivided first and second portions of the fluid steam are then discharged out the sides of the vane inlet device 10 for flow across and then upwardly within the internal region 16.

Liquid in the liquid phase of the fluid stream is separated from the gas phase as it impacts against the vanes 42 and 46 and then flows downwardly along the vanes 42 and 46 onto the webs 66, as well as outwardly along the vanes 42 and 46 for entry into the liquid collection channels 60 through the apertures 64. The liquid through flows through the openings 68 and 69 in the webs 66 and ultimately drains out through the bottom plate 30 of the vane inlet device 10 with reduced opportunity for re-entrainment with the gas phase of the fluid stream. Any liquid that descends from above the vane inlet device 10 onto the top plate 28 is shielded from re-entrainment by being directed into the drain channels 74 and then into the drain passage 72 for discharge below the vane inlet device 10.

In operation of the vane inlet device 10, the beam 48 not only serves to split and segregate the fluid stream as it flows along the passageway 26, but also serves to increase the strength and rigidity of the vane inlet device 10 to reduce the opportunity for the fluid stream to damage and impede the operation of the vane inlet device 10.

Figure 11:
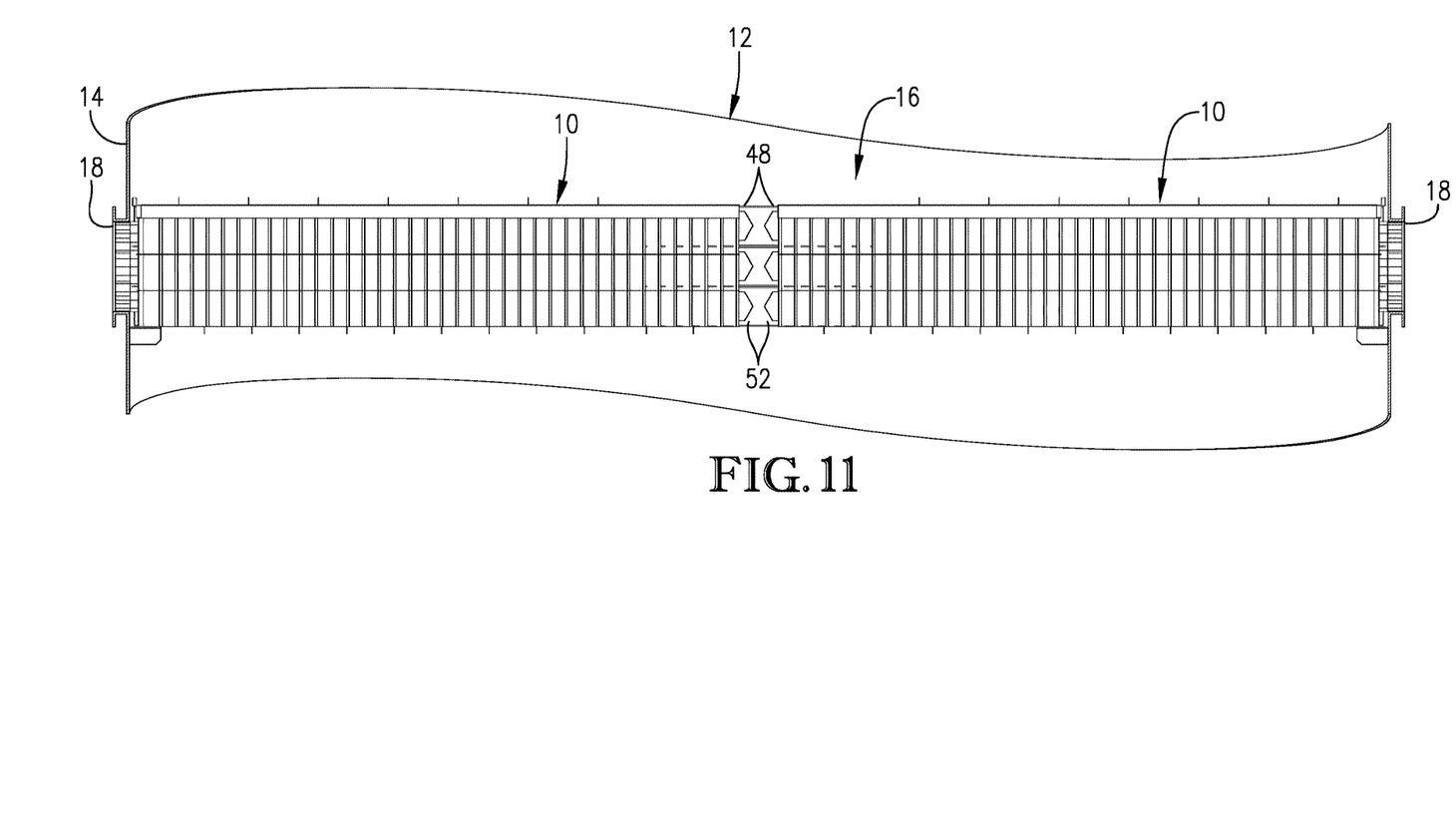
FIG. 11 is a side elevation view of another embodiment of the vessel in which two of the vane inlet devices are used to receive and redistribute two fluid streams entering the vessel through two inlet nozzles that are positioned 180° apart around the circumference of the vessel.

In another embodiment, the fluid stream may be directed into the vessel through two inlet nozzles that are aligned on opposite sides of the external shell. An inlet flow device 10 may be associated with each of the inlet nozzles 18, as depicted in FIG. 11, with the back ends 52 of the two inlet flow devices 10 being joined to each other rather than to the external shell 14 of the vessel 12 as is the case when a single inlet flow device 10 is used. In other embodiments, the inlet nozzles 18 may be positioned at locations other than 180° from each other around the circumference of the vessel 12.

From the foregoing, it will be seen that this invention is one well adapted to attain all the ends and objectives hereinabove set forth together with other advantages that are inherent to the structure.

It will be understood that certain features and subcombinations are of utility and may be employed without reference to other features and subcombinations. This is contemplated by and is within the scope of the invention.

Since many possible embodiments may be made of the invention without departing from the scope thereof, it is to be understood that all matter herein set forth or shown in the accompanying drawings is to be interpreted as illustrative and not in a limiting sense.

What is claimed is:

1. A vane inlet device for use in a vessel to receive and redistribute a fluid stream entering the vessel, said vane inlet device comprising:
   a passageway bounded by a top plate and a bottom plate spaced from the top plate, said passageway having an inlet end for receiving the fluid stream when the fluid stream enters the vessel, an opposite end, and first and second sides;
   a first array of vanes positioned in spaced apart relationship to each other along said first side of the passageway for receiving a first portion of said fluid stream when flowing from the inlet end of the passageway toward the opposite end and redirecting the first portion of the fluid stream out said first side of the passageway;
   a second array of vanes positioned in spaced apart relationship to each other along said second side of the passageway for receiving a second portion of said fluid stream when flowing from the inlet end of the passageway toward the opposite end and redirecting the second portion of the fluid stream out said second side of the passageway,
   wherein a spacing between the first array of vanes and the second array of vanes progressively decreases in a direction from the inlet end of the passageway toward the opposite end; and
   a beam extending from the top plate to the bottom plate and positioned between said first and second arrays of vanes in a direction between the inlet end and the opposite end of the passageway to reduce flexure of the top and bottom plates,
   wherein said beam separates said first portion of the fluid stream from the second portion, and wherein said beam has at least one opening to allow some of said fluid stream to pass through the beam to equalize pressure on opposite sides of the beam.

2. The vane inlet device of claim 1, wherein each of said first and second arrays of vanes extend from the top plate to the bottom plate and is connected thereto.

3. The vane inlet device of claim 2, wherein each of said vanes in said first and second arrays are curved to present a concave surface on a front side of the vane facing in the direction of the inlet end of the passageway.

4. The vane inlet device of claim 3, wherein each of said vanes in said first and second arrays has a leading edge positioned nearest the beam and an opposite trailing edge, wherein the leading edges of the vanes in the first array are positioned in a first common vertical plane and the leading edges of the vanes in the second array are positioned in second common vertical plane, wherein the first and second common vertical planes converge toward each other in the direction from the inlet end of the passageway toward the opposite end.

5. The vane inlet device of claim 4, wherein the trailing edge of each vane in said first and second arrays is formed into a liquid collection channel positioned on a back side of the vane and including an aperture in the vane extending from the front side to the back side of the vane and positioned to allow liquid on the front side of the vane to pass through the aperture and enter the liquid collection channel on the back side of the vane.

6. The vane inlet device of claim 3, including braces extending from said first and second arrays of vanes to the beam.

7. The vane inlet device of claim 3, including a straightening device positioned at said inlet end of the passageway and extending in a direction away from said opposite end of the passageway for reducing turbulent flow of said fluid stream.

8. The vane inlet device of claim 7, including a vertically-extending drain passage formed at said opposite end of the passageway beyond a final pair of vanes in said first and second arrays of vanes and extending downwardly from said top plate.

9. The vane inlet device of claim 8, including a drain channel extending along said top plate to direct liquid when on an upper surface of said top plate to the drain passage.

10. The vane inlet device of claim 3, wherein the leading edges of successive ones of the vanes in said first and second arrays in a direction toward the opposite end of the passageway are spaced at increasing distances from the inlet end of the passageway.

11. The vane inlet device of claim 1, wherein said beam comprises wall segments joined together along edges extending in said direction from the inlet end of the passageway toward the opposite end.

12. A vessel comprising:
   an external shell defining an interior volume;
   an opening in said external shell for delivering a fluid stream into said interior volume;
   an inlet flange surrounding said opening and extending outwardly from said external shell; and
   a vane inlet device positioned primarily in said interior volume of the external shell of the vessel in alignment with said opening and connected to an interior surface of the external shell, said vane inlet device comprising:
     a passageway bounded by a top plate and a bottom plate spaced from the top plate, said passageway having an inlet end for receiving the fluid stream when it enters the vessel, an opposite end, and first and second sides;
     a first array of vanes positioned in spaced apart relationship to each other along said first side of the passageway for receiving a first portion of said fluid stream when flowing from the inlet end of the passageway toward the opposite end and redirecting it out said first side of the passageway;
     a second array of vanes positioned in spaced apart relationship to each other along said second side of the passageway for receiving a second portion of said fluid stream when flowing from the inlet end of the passageway toward the opposite end and redirecting it out said second side of the passageway, wherein a spacing between the first array of vanes and the second array of vanes progressively decreases in a direction from the inlet end of the passageway toward the opposite end;

a beam extending from the top plate to the bottom plate and positioned between said first and second arrays of vanes in a direction between the inlet end and the opposite end of the passageway to reduce flexure of the top and bottom plates, wherein said beam separates said first portion of the fluid stream from the second portion, and wherein said beam has at least one opening to allow some of said fluid stream to pass through the beam to equalize pressure on opposite sides of the beam; and a straightening device positioned at said inlet end of the passageway and extending into said inlet flange for reducing turbulent flow of said fluid stream.

13. The vessel of claim 12, wherein each of said first and second arrays of vanes extend from the top plate to the bottom plate and is connected thereto.

14. The vessel of claim 13, wherein said vanes in said first and second arrays are curved to present a concave surface on a front side of the vane facing in the direction of the inlet end of the passageway.

15. The vessel of claim 14, wherein each of said vanes in said first and second arrays has a leading edge positioned nearest the beam and an opposite trailing edge, wherein the leading edges of the vanes in the first array are positioned in a first common vertical plane and the leading edges of the vanes in the second array are positioned in second common vertical plane, wherein the first and second common vertical planes converge toward each other in the direction from the inlet end of the passageway toward the opposite end.

16. The vessel of claim 15, wherein the trailing edge of each vane in said first and second arrays is formed into a liquid collection channel positioned on a back side of the vane and including an aperture in the vane extending from the front side to the back side of the vane and positioned to allow liquid on the front side of the vane to pass through the aperture and enter the liquid collection channel on the back side of the vane.

17. The vessel of claim 14, including a vertically-extending drain passage formed at said opposite end of the passageway beyond a final pair of vanes in said first and second arrays of vanes and extending downwardly from said top plate.

18. The vessel of claim 17, including a drain channel extending along said top plate to direct liquid when on an upper surface of said top plate to the drain passage.

19. The vessel of claim 12, wherein said beam comprises wall segments joined together along edges extending in said direction from the inlet end of the passageway toward the opposite end.

* * * * *